US012609963B2

(12) United States Patent
Albero et al.

(10) Patent No.: US 12,609,963 B2
(45) Date of Patent: Apr. 21, 2026

(54) COUNTERMEASURE IMPLEMENTATION PLATFORM FOR PREVENTING INFORMATION MISUSE

(71) Applicant: Bank of America Corporation, Charlotte, NC (US)

(72) Inventors: George Anthony Albero, Charlotte, NC (US); Maharaj Mukherjee, Poughkeepsie, NY (US); Jinna Kim, Charlotte, NC (US); Timothy Scott Murphy, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 317 days.

(21) Appl. No.: 18/228,137

(22) Filed: Jul. 31, 2023

(65) Prior Publication Data

US 2025/0047708 A1 Feb. 6, 2025

(51) Int. Cl.
*H04L 9/40* (2022.01)
*G06F 21/53* (2013.01)

(52) U.S. Cl.
CPC .......... *H04L 63/1491* (2013.01); *G06F 21/53* (2013.01)

(58) Field of Classification Search
None
See application file for complete search history.

(56) References Cited

U.S. PATENT DOCUMENTS

| | | | |
|---|---|---|---|
| 4,959,015 A | 9/1990 | Rasinski et al. | |
| 8,549,643 B1 * | 10/2013 | Shou ..................... | G06F 21/556 |
| | | | 455/410 |
| 8,819,825 B2 | 8/2014 | Keromytis et al. | |
| 9,043,905 B1 | 5/2015 | Allen et al. | |
| 9,641,544 B1 | 5/2017 | Treat et al. | |
| 9,756,075 B1 | 9/2017 | Gopalakrishna et al. | |
| 9,900,330 B1 | 2/2018 | Dargude et al. | |
| 10,263,996 B1 * | 4/2019 | Goodsitt ............... | H04L 63/102 |
| 10,834,130 B2 | 11/2020 | Erez et al. | |
| 2005/0039046 A1 | 2/2005 | Bardsley et al. | |
| 2005/0198520 A1 | 9/2005 | Bardsley et al. | |
| 2006/0000988 A1 | 1/2006 | Stuart et al. | |
| 2017/0183104 A1 | 6/2017 | Colby | |
| 2017/0214709 A1 | 7/2017 | Maestas | |
| 2019/0291008 A1 * | 9/2019 | Cox ......................... | G06N 3/08 |
| 2020/0007586 A1 | 1/2020 | Seeber et al. | |
| 2021/0120028 A1 | 4/2021 | Pluderman et al. | |
| 2021/0243204 A1 | 8/2021 | Taylor et al. | |

(Continued)

*Primary Examiner* — Farid Homayounmehr
*Assistant Examiner* — Suman Debnath
(74) *Attorney, Agent, or Firm* — Banner & Witcoff, Ltd.

(57) ABSTRACT

A computing platform may train, using historical information access pattern information, a machine learning model to identify unauthorized information access patterns. The computing platform may obscure internal traffic pattern information, and monitor access of the obscured internal traffic pattern information. The computing platform may generate, by inputting information of the access into the machine learning model, a user evaluation output, and may compare the user evaluation output to a first user evaluation threshold. Based on identifying that the user evaluation output meets or exceeds the first user evaluation threshold, the computing platform may modify traffic routing rules corresponding to the user, which may cause activity by the user to be routed to a secure sandbox for further analysis.

20 Claims, 8 Drawing Sheets

(56) References Cited

U.S. PATENT DOCUMENTS

| | | |
|---|---|---|
| 2021/0392162 A1 | 12/2021 | Kidney |
| 2022/0124068 A1* | 4/2022 | Arpee .................... G06N 3/045 |
| 2022/0385648 A1 | 12/2022 | Keiter et al. |
| 2023/0137459 A1 | 5/2023 | Karri et al. |
| 2023/0169051 A1* | 6/2023 | Tulshan ................ G06F 16/215 |
| | | 707/692 |
| 2023/0188540 A1 | 6/2023 | Valluri et al. |

* cited by examiner

102

Countermeasure Implementation Platform

111

Processor(s)

112

Memory(s)

Countermeasure Implementation Module
112a

Countermeasure Implementation Database
112b

Machine Learning Engine
112c

113

Communication Interface(s)

305

Countermeasure Implementation Interface

Potential information misuse has been identified.  Future traffic for this individual will be routed to a sandbox for further analysis.

| APPROVE | DENY |
|---------|------|

Countermeasure Implementation Interface

Potential information misuse has been identified.  Access permissions for this individual have been modified.

| APPROVE | DENY |
|---------|------|

FIG. 4

COUNTERMEASURE IMPLEMENTATION PLATFORM FOR PREVENTING INFORMATION MISUSE

BACKGROUND

In some instances, access to internal information may result in the potential for misuse of such internal information. In some instances, such access may be granted to authorized users and/or illicitly obtained by unauthorized users. In either event, such access may present opportunities for information misuse, whether intentional or unintentional. It may be important to impose countermeasures to prevent such misuse.

SUMMARY

Aspects of the disclosure provide effective, efficient, scalable, and convenient technical solutions that address and overcome the technical problems associated with countermeasures for information misuse. In accordance with one or more embodiments of the disclosure, a computing platform comprising at least one processor, a communication interface, and memory storing computer-readable instructions may train, using historical information access pattern information, a machine learning model to identify unauthorized information access patterns. The computing platform may obscure internal traffic pattern information by: randomizing the internal traffic pattern information, and introducing, into the internal traffic pattern information, decoy traffic pattern information. The computing platform may monitor access of the obscured internal traffic pattern information. The computing platform may generate, by inputting information of the access into the machine learning model, a user evaluation output representing a likelihood of misuse by a user corresponding to the access. The computing platform may compare the user evaluation output to a first user evaluation threshold. Based on identifying that the user evaluation output meets or exceeds the first user evaluation threshold, the computing platform may modify traffic routing rules corresponding to the user, which may cause activity by the user to be routed to a secure sandbox for further analysis.

In one or more instances, training the machine learning model using the historical information access pattern information may include training the machine learning model using instances of historical information access labelled based on whether or not the corresponding instances were identified as misuse. In one or more instances, randomizing the internal traffic pattern information may include rearranging the internal traffic pattern information.

In one or more examples, introducing the decoy traffic pattern information may include introducing white noise into the internal traffic pattern information. In one or more examples, the access may be permitted based on access permissions, and details of the access permissions may be obscured from the user.

In one or more instances, the access permissions may define a separation of access between the internal traffic pattern information and storage systems corresponding to the internal traffic pattern information. In one or more instances, monitoring the access may include monitoring which internal traffic pattern information is being accessed.

In one or more examples, the computing platform may generate, using a reporting system plug in of the computing platform, a summary indicating results of the monitoring and an indication that the user evaluation output meets or exceeds the first user evaluation threshold. The computing platform may send, to an administrator device, the summary and one or more commands directing the administrator device to display the summary, which may cause the administrator device to display the summary.

In one or more instances, routing the activity of the user to the secure sandbox may include: granting, at the secure sandbox, decoy access for the user, where the decoy access may grant supervised access, for the user, to decoy information generated based on the user's previous access, and monitoring, at the secure sandbox, interactions of the user with the decoy information. In one or more instances, the machine learning model may be further trained based on known user vulnerability information, and generating the user evaluation output may be further based on the known user vulnerability information.

In one or more examples, based on identifying that the user evaluation output does not meet or exceed the first user evaluation threshold, the computing platform may compare the user evaluation output to a second user evaluation threshold, where the second user evaluation threshold is lower than the first user evaluation threshold. Based on identifying that the user evaluation output meets or exceeds the second user evaluation threshold, the computing platform may modify information access policies for the user.

In one or more instances, modifying the information access policies for the user may cause a portion of the internal traffic pattern information to be obscured by a hover over user interface element, and the hover over user interface element may prompt for additional authentication credentials to access the corresponding internal traffic pattern information. In one or more instances, the computing platform may update, using a dynamic feedback loop and based on the information of the access and the user evaluation output, the machine learning model, which may increase accuracy of the machine learning model in identifying information misuse.

BRIEF DESCRIPTION OF DRAWINGS

The present disclosure is illustrated by way of example and is not limited in the accompanying figures in which like reference numerals indicate similar elements and in which:

FIGS. 3-4 depict illustrative user interfaces for countermeasure implementation to prevent information misuse in accordance with one or more example embodiments.

DETAILED DESCRIPTION

Figure 1A:
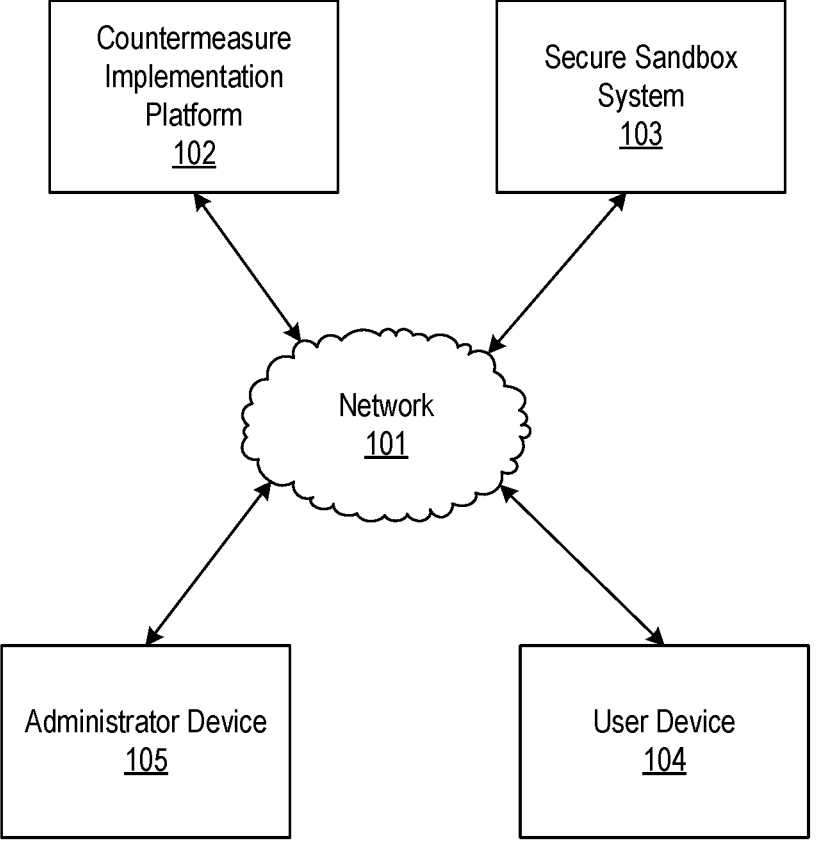
FIGS. 1A and 1B depict an illustrative computing environment for countermeasure implementation to prevent information misuse in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to countermeasures to prevent information misuse, as is described further below. Some insider threats may be intentional, whereas others might not. For example, due to various access to data and systems, "bad apples" may leverage extra information for bad actions. Additionally, even "good apples" may become career launchers or second streamers taking advantage of insider information for their next job. Thus, multiple concurrent countermeasures may be needed to mitigate risk for business-as-usual applications and operations, leveraging automation and technology.

Administrators, non-administrators, and essentially any employee (e.g., full-time, temporary, seasonal, part-time, contractors, vendors, consultants, etc.) may have access to company data and/or system(s) in order to complete their job. Described herein is a system for applying countermeasures in various combinations to reduce insider threat risk, such as:

Automated monitoring of servers and various endpoints/ "exits" (internal, external, cloud, or the like)

Randomization of patterns of internal traffic, and incorporation of decoys/harmless noise as "bait"

Using a detection tool/model to see which employees are acting in harmful patterns Limited access permissions, where no one knows access permissions for themselves or others Causing separation of access (to data and systems) as well as separation of duties Tracking what asset/data is leaving (when and where) when monitoring assets and databases Creating decoy access to systems and fake data Using monitoring and detections tools that plug into an existing organizations reporting tools to summarize potentially harmful patterns and sending such summaries for routine leadership review Leveraging models and machine learning to create a risk score based on employee information (e.g., approved side hustles, hybrid work-from-home arrangements, which may cause new vulnerabilities and considerations such as infringing upon privacy and differentiating personal versus company property)

As risk scores increase, decreasing levels of employee real access to data and systems accordingly, and switching access to test or decoy environments depending on criticality and potential harmful impacts These and other features are described in greater detail below.

Figure 1B:
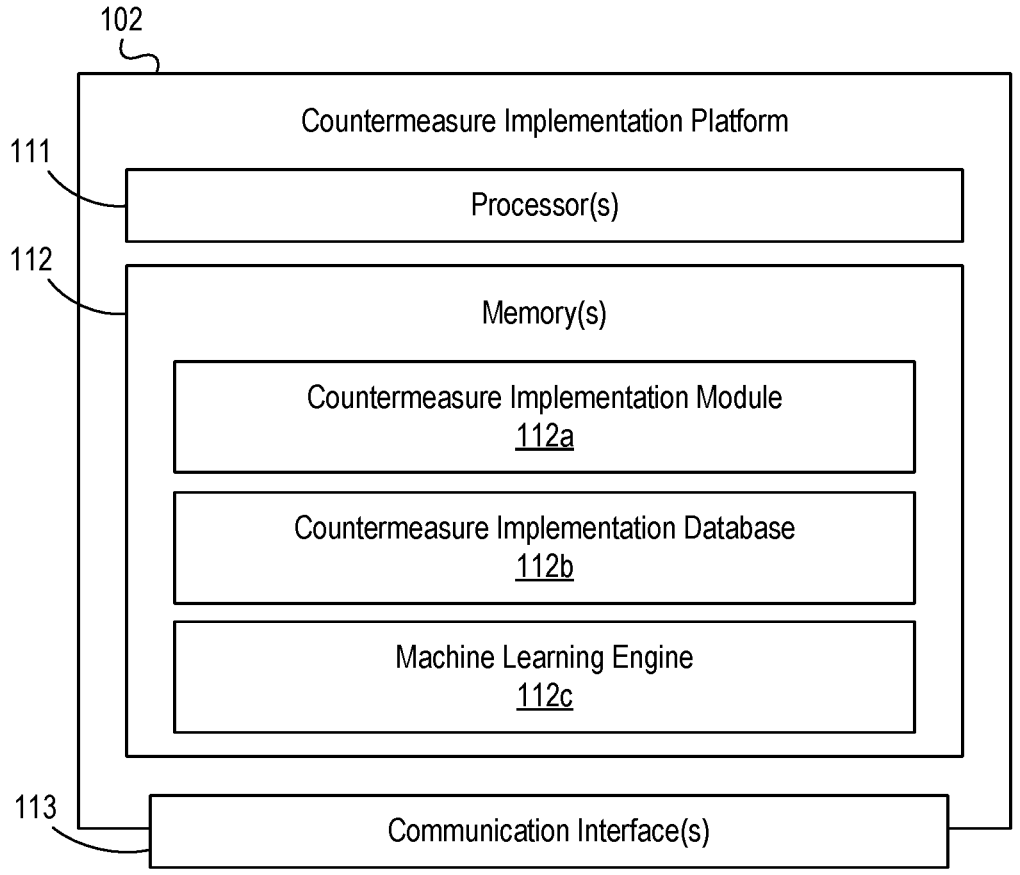

FIGS. 1A-1B depict an illustrative computing environment for using countermeasures to prevent information misuse in accordance with one or more example embodiments. Referring to FIG. 1A, computing environment 100 may include one or more computer systems. For example, computing environment 100 may include countermeasure implementation platform 102, secure sandbox system 103, user device 104, and/or administrator device 105.

Countermeasure implementation platform 102 may include one or more computing devices (servers, server blades, or the like) and/or other computer components (e.g., processors, memories, communication interfaces, or the like). For example, the countermeasure implementation platform 102 may include a number of server endpoints, and may be configured to monitor information access at these endpoints. In some instances, the countermeasure implementation platform 102 may further be configured to train, host, and apply a machine learning model to evaluate information access for a likelihood of misuse. In instances where potential misuse is identified, the countermeasure implementation platform 102 may be configured to implement one or more countermeasures to prevent and/or otherwise deter such misuse.

Secure sandbox system 103 may include one or more computing devices (servers, server blades, or the like) and/or other computer components (e.g., processors, memories, communication interfaces, or the like). In some instances, the secure sandbox system 103 may be configured to receive traffic from users flagged as engaging in potential information misuse. In these instances, the secure sandbox system 103 may isolate and/or otherwise analyze such traffic for additional insights and system security. In some instances, the secure sandbox system 103 may be separate from the countermeasure implementation platform 102. In other instances, the secure sandbox system 103 may be integrated into the countermeasure implementation platform 102.

User device 104 may be or include one or more devices (e.g., laptop computers, desktop computer, smartphones, tablets, and/or other devices) configured for use in accessing internal information (which may, in some instances, include confidential information and/or other information with a potential for misuse). In some instances, the user device 104 may be operated by a user engaging in intentional information misuse. In other instances, the user device 104 may be operated by a user engaging in unintentional misuse of the information. In some instances, the user device 104 may be operated by an employee of the enterprise organization corresponding to the countermeasure implementation platform 102 (e.g., an internal threat) or a non-employee (e.g., an external threat). In some instances, the user device 104 may be configured to display graphical user interfaces (e.g., information interfaces, or the like). Any number of such user devices may be used to implement the techniques described herein without departing from the scope of the disclosure.

Administrator device 105 may be or include one or more devices (e.g., laptop computers, desktop computer, smartphones, tablets, and/or other devices) configured for use in providing information security. For example, the administrator device 105 may be used by an employee of an organization (e.g., such as an organization corresponding to the countermeasure implementation platform 102). In some instances, the administrator user device 105 may be configured to display graphical user interfaces (e.g., countermeasure implementation interfaces, access monitoring summary interfaces, or the like). Any number of such user devices may be used to implement the techniques described herein without departing from the scope of the disclosure.

Computing environment 100 also may include one or more networks, which may interconnect countermeasure implementation platform 102, secure sandbox system 103, user device 104, and administrator device 105. For example, computing environment 100 may include a network 101 (which may interconnect, e.g., countermeasure implementation platform 102, secure sandbox system 103, user device 104, and administrator device 105).

In one or more arrangements, countermeasure implementation platform 102, secure sandbox system 103, user device 104, and administrator device 105 may be any type of computing device capable of receiving a user interface, receiving input via the user interface, and communicating the received input to one or more other computing devices. For example, countermeasure implementation platform 102, secure sandbox system 103, user device 104, administrator device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of countermeasure implementation platform 102, secure sandbox system 103, user device 104, and administrator device 105 may, in some instances, be special-purpose computing devices configured to perform specific functions.

Referring to FIG. 1B, countermeasure implementation platform 102 may include one or more processors 111, memory 112, and communication interface 113. A data bus may interconnect processor 111, memory 112, and communication interface 113. Communication interface 113 may be a network interface configured to support communication between countermeasure implementation platform 102 and one or more networks (e.g., network 101, or the like). Memory 112 may include one or more program modules having instructions that when executed by processor 111 cause countermeasure implementation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of countermeasure implementation platform 102 and/or by different computing devices that may form and/or otherwise make up countermeasure implementation platform 102. For example, memory 112 may have, host, store, and/or include countermeasure implementation module 112a, countermeasure implementation database 112b, and machine learning engine 112c. Countermeasure implementation module 112a may have instructions that direct and/or cause countermeasure implementation platform 102 to execute advanced techniques to detect potential information misuse and implement countermeasures accordingly. Countermeasure implementation database 112b may store information used by countermeasure implementation module 112a, in performing the misuse detection, countermeasure implementation, and/or in performing other functions. Machine learning engine 112c may be used to train, deploy, and/or otherwise refine models used to support functionality of the countermeasure implementation module 112a through both initial training and one or more dynamic feedback loops, which may, e.g., enable continuous improvement of the countermeasure implementation platform 102 and further optimize the detection and mitigation of attempts to misuse internal information.

Figure 2A:
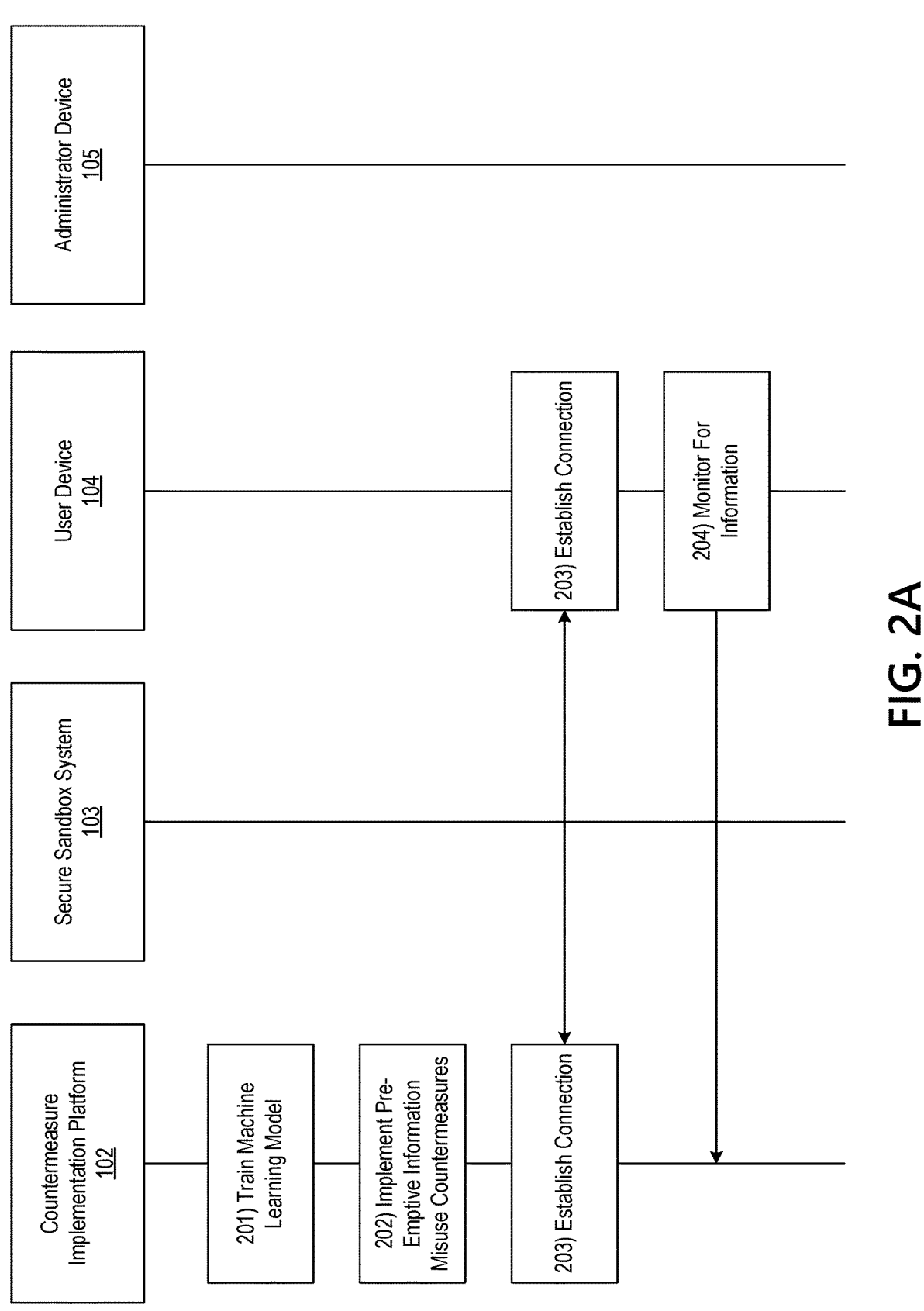
FIGS. 2A-2D depict an illustrative event sequence for countermeasure implementation to prevent information misuse in accordance with one or more example embodiments.

FIGS. 2A-2D depict an illustrative event sequence for implementing countermeasures to prevent information misuse in accordance with one or more example embodiments. Referring to FIG. 2A, at step 201, the countermeasure implementation platform 102 may train a machine learning model for misuse detection. For example, the countermeasure implementation platform 102 may receive historical information access pattern information (e.g., what was accessed, where it was accessed from, who accessed it, communication information, how often information was accessed, and/or other information). In some instances, this information may be labelled based on whether or not the corresponding pattern was ultimately identified as corresponding to information misuse. In some instances, the information may be labelled with historical user evaluation scores, indicating a likelihood of corresponding misuse. In doing so, the machine learning model may establish stored correlations between information access patterns and the user evaluation scores, which may, e.g., cause the machine learning model to output user evaluation scores based on newly input information access information.

In some instances, the countermeasure implementation platform 102 may also train the machine learning model using known information about individuals, including particular characteristics associated with a higher risk profile (e.g., engaged in side-businesses, remote work arrangements, and/or other characteristics that may make individuals more susceptible to information misuse, whether intentionally or unintentionally). In these instances, the countermeasure implementation platform 102 may train the machine learning model to adjust user evaluation scores based on such known information (e.g., multiple the score by 1.1 if any of the identified characteristics apply to the user, or the like).

In some instances, in training the machine learning model, countermeasure implementation platform 102 may use one or more supervised learning techniques (e.g., decision trees, bagging, boosting, random forest, k-NN, linear regression, artificial neural networks, support vector machines, and/or other supervised learning techniques), unsupervised learning techniques (e.g., classification, regression, clustering, anomaly detection, artificial neutral networks, and/or other unsupervised models/techniques), and/or other techniques.

At step 202, the countermeasure implementation platform 102 may implement one or more pre-emptive information misuse countermeasures. For example, the countermeasure implementation platform 102 may implement randomization techniques on internal information (e.g., internal traffic patterns indicating communications between individuals, computer processing usage, resource allocation, memory usage, and/or other information), which may, for example, obscure the valid internal information in a way that may be undetectable by those attempting to access such information for misuse (e.g., to gain non-public insights about the enterprise or enterprises corresponding to the countermeasure implementation platform 102) by rearranging the internal information.

Additionally or alternatively, the countermeasure implementation platform 102 may inject and/or otherwise incorporate decoy information into the internal information storage systems along with the internal information, which may, for example, act as noise to disrupt and/or otherwise obscure the internal information. For example, the countermeasure implementation platform 102 may implement simulated increases in computer processing power correlated to stock trades for a given company, information corresponding to market movers, or the like. In these instances, such decoy information might not otherwise be distinguishable from the legitimate internal information.

At step 203, the user device 104 may establish a first wireless data connection with the user device 104. For example, the user device 104 may establish a first wireless data connection with the countermeasure implementation platform 102 to link the user device 104 to the countermeasure implementation platform 102 (e.g., in preparation for monitoring the countermeasure implementation platform 102 for information). In some instances, the user device 104 may identify whether a connection is already established with the countermeasure implementation platform 102. If a connection is already established with the countermeasure implementation platform 102, the user device 104 might not re-establish the connection. If a connection is not yet established with the countermeasure implementation platform 102, the user device 104 may establish the first wireless data connection as described herein.

At step 204, the user device 104 may monitor the countermeasure implementation platform 102 for internal information. For example, the user device 104 may monitor the countermeasure implementation platform 102 for internal information while the first wireless data connection is established. In these instances, the user device 104 may be configured with or otherwise have access to a correlation tool, which may, for example, enable the user device 104 to identify insights about the enterprise based on the internal information. Accordingly, the user device 104 may monitor the countermeasure implementation platform 102 to access such information for the purpose of identifying these insights. In some instances, in monitoring the countermeasure implementation platform 102, the user device 104 may detect the internal information that has been randomized, integrated with decoy data, and/or otherwise obscured. In some instances, in monitoring the countermeasure implementation platform 102, the user device 104 may monitor one or more server endpoints/exits corresponding to the countermeasure implementation platform 102 (e.g., internal, external, cloud, or the like).

In some instances, the user's ability to monitor for internal information may be controlled by access permissions. In these instances, the details of such access permissions may be obscured from the user (which may, e.g., prevent the user from detecting the implementation of any countermeasures such as modified traffic routing and/or information access permissions). In some instances, the access permissions may define a separation of access between the internal information, storage systems, and/or other accessible locations.

Figure 2B:
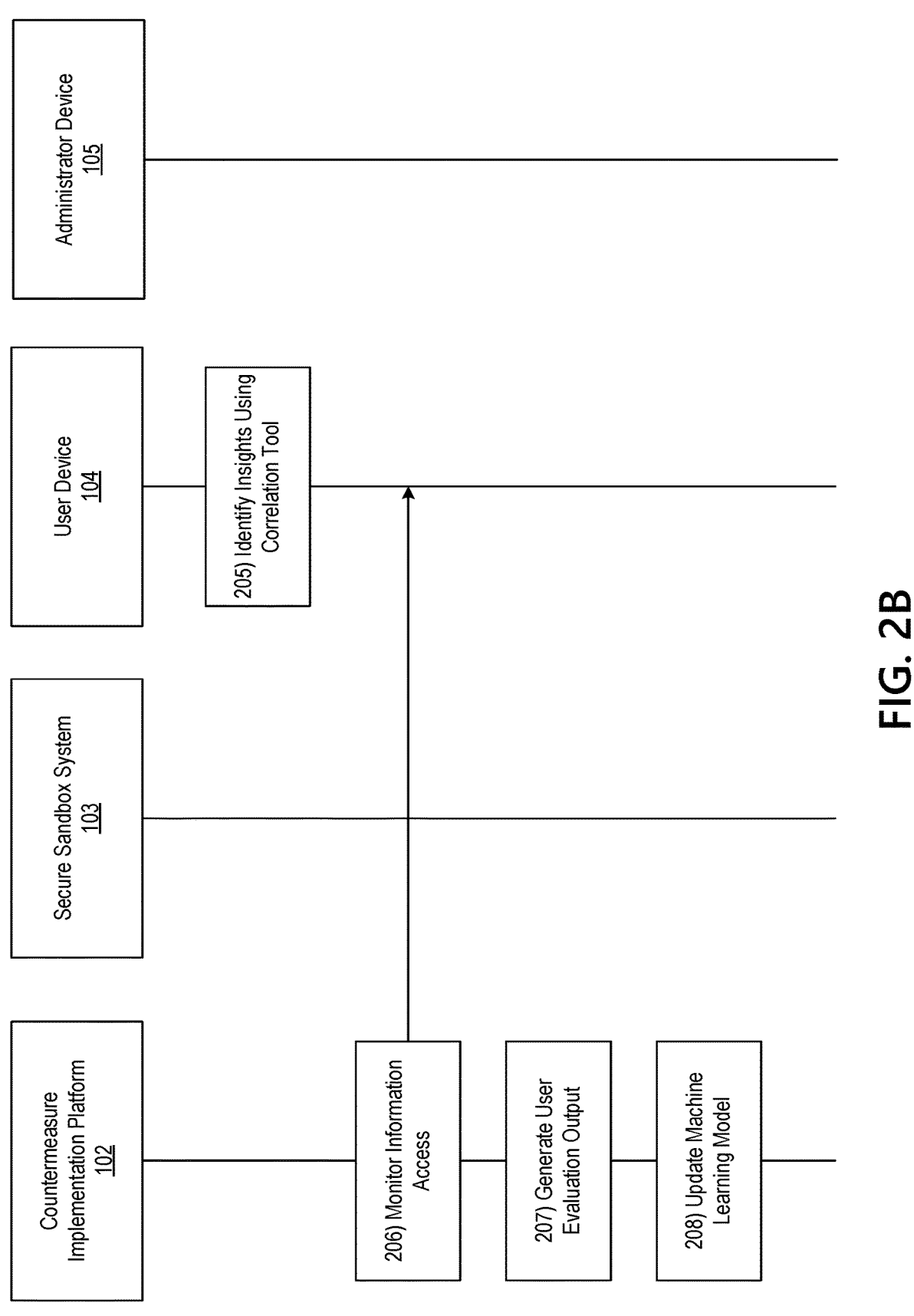

Referring to FIG. 2B, at step 205, the user device 104 may attempt to identify insights using a correlation tool as described above with respect to step 204. For example, the user device 104 may feed the internal information, obtained at step 204, into the correlation tool to attempt to identify actions being performed on the enterprise's behalf, and/or other non-public insights (e.g., based on comparing the internal information to market activity, or the like). However, as a result of the obfuscation of the internal information using the randomization, decoy data, and/or other techniques, such insights may be inaccurate. For example, the user device 104 may fail to identify insights, identify false insights, and/or otherwise fail to utilize internal information of the enterprise. As a result, the enterprise may be protected from attempts to misuse their internal information.

At step 206, the countermeasure implementation platform 102 may monitor the information access being performed by the user device 104 (e.g., the information access performed at step 204 and/or other continued access). For example, the countermeasure implementation platform 102 may identify what information is being accessed, who is accessing it, when they are accessing it, where they are accessing it from, who they are notifying of the access, who else is accessing it, and/or other information corresponding to patterns of information access.

At step 207, the countermeasure implementation platform 102 may feed this information access information into the machine learning model (trained at step 201). For example, the countermeasure implementation platform 102 may compare the information access information to historical information access information of the machine learning model to identify a correlation between such information. Once a match (an exact match, an approximate match, or the like) is identified, the machine learning model may identify a user evaluation output score corresponding to the matching historical information access information, and may select this user evaluation output for the current information access information. In some instances, the machine learning model may further adjust the user evaluation output based on user characteristic information as is described above with regard to step 201 (e.g., increase or decrease the user evaluation output using a multiplier based on characteristics of the user that suggest an increased or decreased susceptibility to misuse (e.g., known user vulnerability information, or the like), or the like).

At step 208, the countermeasure implementation platform 102 may update the machine learning model based on the information access information, the user evaluation output, and/or other information. In doing so, the countermeasure implementation platform 102 may continue to refine the machine learning model using a dynamic feedback loop, which may, e.g., increase the accuracy and effectiveness of the model in identifying potential misuse. For example, the countermeasure implementation platform 102 may reinforce, modify, and/or otherwise update the machine learning model, thus causing the model to continuously improve (e.g., in terms of misuse detection).

In some instances, the countermeasure implementation platform 102 may continuously refine the machine learning model. In some instances, the countermeasure implementation platform 102 may maintain an accuracy threshold for the machine learning model, and may pause refinement (through the dynamic feedback loops) of the model if the corresponding accuracy is identified as greater than the corresponding accuracy threshold. Similarly, if the accuracy fails to be equal or less than the given accuracy threshold, the countermeasure implementation platform 102 may resume refinement of the model through the corresponding dynamic feedback loop.

Figure 2C:
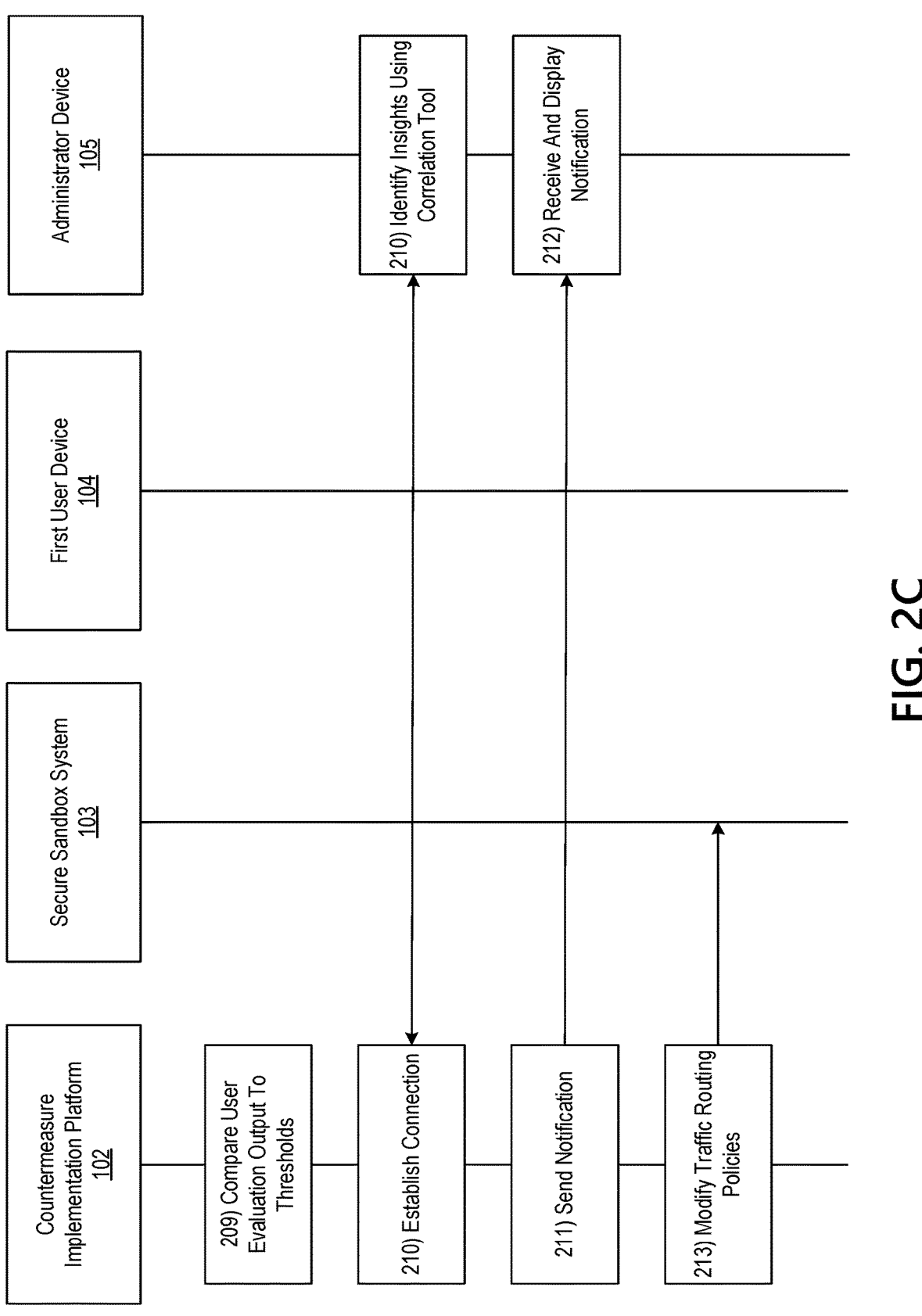

Referring to FIG. 2C, at step 209, the countermeasure implementation platform 102 may compare the user evaluation output to one or more evaluation thresholds to identify whether or not additional countermeasures should be implemented. For example, the countermeasure implementation platform 102 may compare the user evaluation output to a first evaluation threshold. If the countermeasure implementation platform 102 identifies that the user evaluation output meets or exceeds the user evaluation output, the countermeasure implementation platform 102 may proceed to step 210. Otherwise, the countermeasure implementation platform 102 may compare the user evaluation output to a second evaluation threshold, lower than the first evaluation threshold. If the countermeasure implementation platform 102 identifies that the user evaluation output meets or exceeds the second evaluation threshold, the countermeasure implementation platform 102 may proceed to step 215. Otherwise, if the countermeasure implementation platform 102 identifies that the user evaluation output does not meet or exceed the second evaluation threshold, the countermeasure implementation platform 102 may identify that additional countermeasures need not be implemented, and may return to 202 to continue obscuring internal information, monitoring for user access, and evaluating such access for misuse accordingly.

At step 210, the countermeasure implementation platform 102 may establish a connection with the administrator device 105. For example, the countermeasure implementation platform 102 may establish a second wireless data connection with the administrator device 105 to link the countermeasure implementation platform 102 to the administrator device 105 (e.g., in preparation for sending notifications, interaction summaries, and/or other information). In some instances, the countermeasure implementation platform 102 may identify whether or not a connection is already established with the administrator device 105. If a connection is already established with the administrator device 105, the countermeasure implementation platform 102 might not re-establish the connection. If a connection is not yet established with the administrator device 105, the countermeasure implementation platform 102 may establish the second wireless data connection as described herein.

At step 211, the countermeasure implementation platform 102 may send a misuse notification to the administrator device 105. For example, the countermeasure implementation platform 102 may send the misuse notification to the administrator device 105 via the communication interface 113 and while the second wireless data connection is established. In some instances, the countermeasure implementation platform 102 may also send one or more commands directing the administrator device 105 to display the misuse notification (e.g., via a countermeasure implementation interface).

In some instances, the misuse notification may be generated and/or otherwise sent via a reporting system plug in at the countermeasure implementation platform 102 and/or other device. In these instances, the misuse notification may correspond to a countermeasure implementation interface that includes a summary of the results of monitoring the information access and a result of the threshold comparison for the user evaluation output.

At step 212, the administrator device 105 may receive the misuse notification sent at step 211. For example, the administrator device 105 may receive the misuse notification while the second wireless data connection is established. In some instances, the administrator device 105 may also receive the one or more commands directing the administrator device 105 to display the misuse notification. Based on or in response to the one or more commands directing the administrator device 105 to display the misuse notification, the administrator device 105 may display the misuse notification. For example, the administrator device 105 may display a graphical user interface similar to graphical user interface 305, which is illustrated in FIG. 3. In some instances, the graphical user interface 305 may prompt for user approval of the proposed countermeasures, and may proceed accordingly based on the user input. In these instances, the machine learning model may be further refined based on this user input. In other instances, the countermeasures may be automatically initiated without prompting for input.

At step 213, the countermeasure implementation platform 102 may modify traffic routing policies for the user and/or devices associated with the user so as to route traffic for that user to the secure sandbox system 103. For example, the countermeasure implementation platform 102 may redirect traffic from servers and/or other endpoints/exits of the countermeasure implementation platform 102 (e.g., internal, external, cloud, or the like) to the secure sandbox system 103. By doing so, the countermeasure implementation platform 102 may isolate traffic associated with the user from the internal information storage/systems.

Figure 2D:
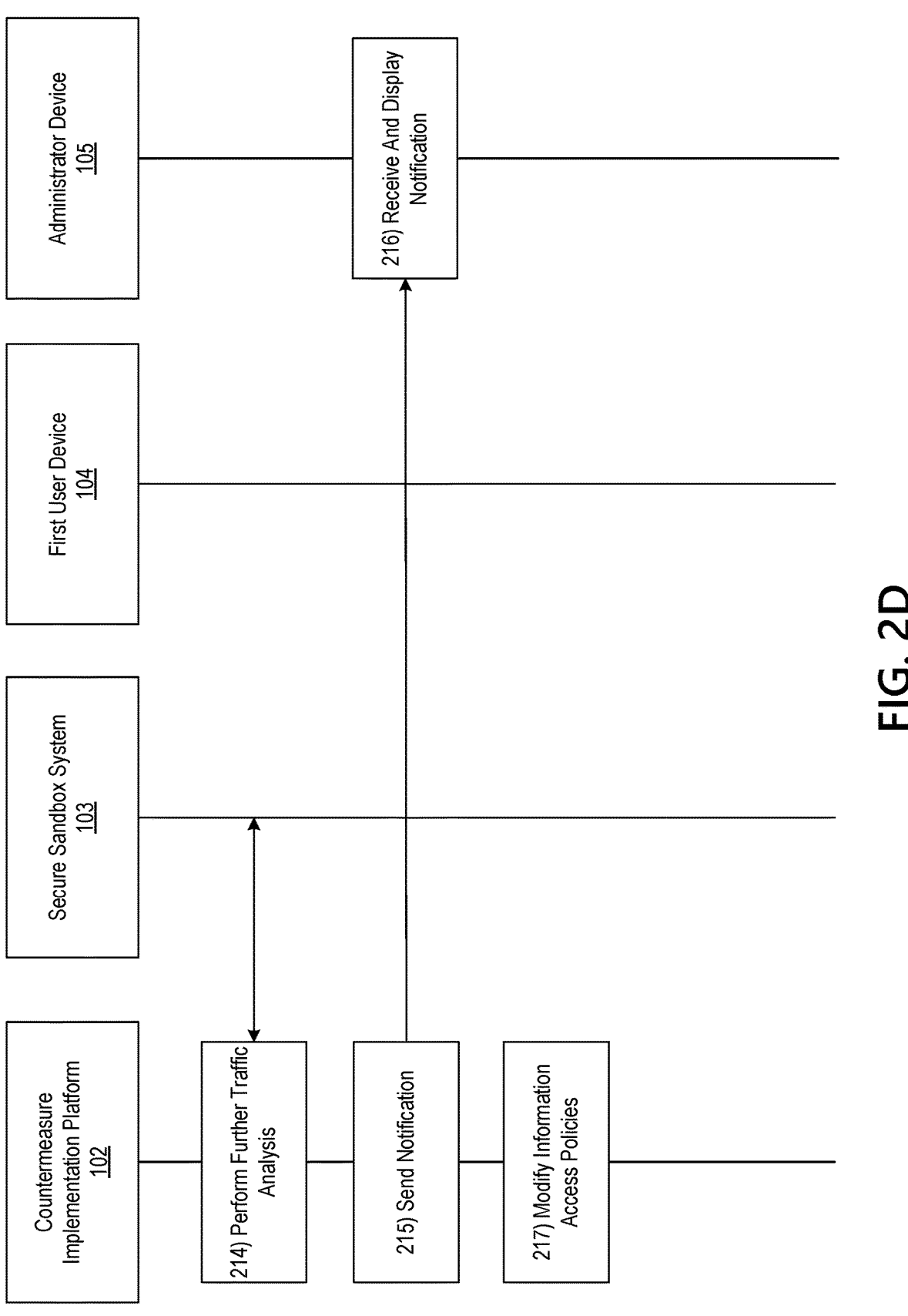

Referring to FIG. 2D, at step 214, the countermeasure implementation platform 102 and/or secure sandbox system 103 may perform further analysis of the corresponding traffic/information access attempts. In some instances, based on the results of such further analysis, the countermeasure implementation platform 102 and/or secure sandbox system 103 may trigger additional countermeasures (e.g., pulling/reviewing historical information for the user and identifying other involved individuals accordingly, shutting off information access, granting decoy access or the like). In these instances, granting decoy access may include granting supervised access, for the user, to decoy information generated based on the user's previous information access patterns and monitoring interactions of the user with the decoy information. After updating the traffic routing policy and initiating monitoring of the traffic at the secure sandbox system 103, the countermeasure implementation platform 102 may return to 202 to continue obscuring internal information, monitoring for user access, and evaluating such access for misuse accordingly.

Returning to step 209, if the countermeasure implementation platform 102 identified that the user evaluation output did not meet or exceed the first evaluation threshold but did meet or exceed the second evaluation threshold, the countermeasure implementation platform 102 may proceed to step 215.

Referring to step 215, the countermeasure implementation platform 102 may send a misuse notification to the administrator device 105. For example, the countermeasure implementation platform 102 may send the misuse notification to the administrator device 105 via the communication interface 113 and while the second wireless data connection is established. In some instances, the countermeasure implementation platform 102 may also send one or more commands directing the administrator device 105 to display the misuse notification (e.g., via a countermeasure implementation interface).

In some instances, the misuse notification may be generated and/or otherwise sent via a reporting system plug in at the countermeasure implementation platform 102 and/or other device. In these instances, the misuse notification may correspond to a countermeasure implementation interface that includes a summary of the results of monitoring the information access and a result of the threshold comparison for the user evaluation output.

At step 216, the administrator device 105 may receive the misuse notification sent at step 211. For example, the administrator device 105 may receive the misuse notification while the second wireless data connection is established. In some instances, the administrator device 105 may also receive the one or more commands directing the administrator device 105 to display the misuse notification. Based on or in response to the one or more commands directing the administrator device 105 to display the misuse notification, the administrator device 105 may display the misuse notification. For example, the administrator device 105 may display a graphical user interface similar to graphical user interface 405, which is illustrated in FIG. 4. In some instances, the graphical user interface 405 may prompt for user approval of the proposed countermeasures, and may proceed accordingly based on the user input. In these instances, the machine learning model may be further refined based on this user input. In other instances, the countermeasures may be automatically initiated without prompting for input.

At step 217, the countermeasure implementation platform 102 may modify information access policies for the user. For example, the countermeasure implementation platform 102 may cause certain information and/or systems to be obscured via a hover over interface element, which may, e.g., prompt the user to provide additional authentication credentials to access and/or otherwise unlock the corresponding information. Other similar information access policies may be modified without departing from the scope of the disclosure.

Figure 5:
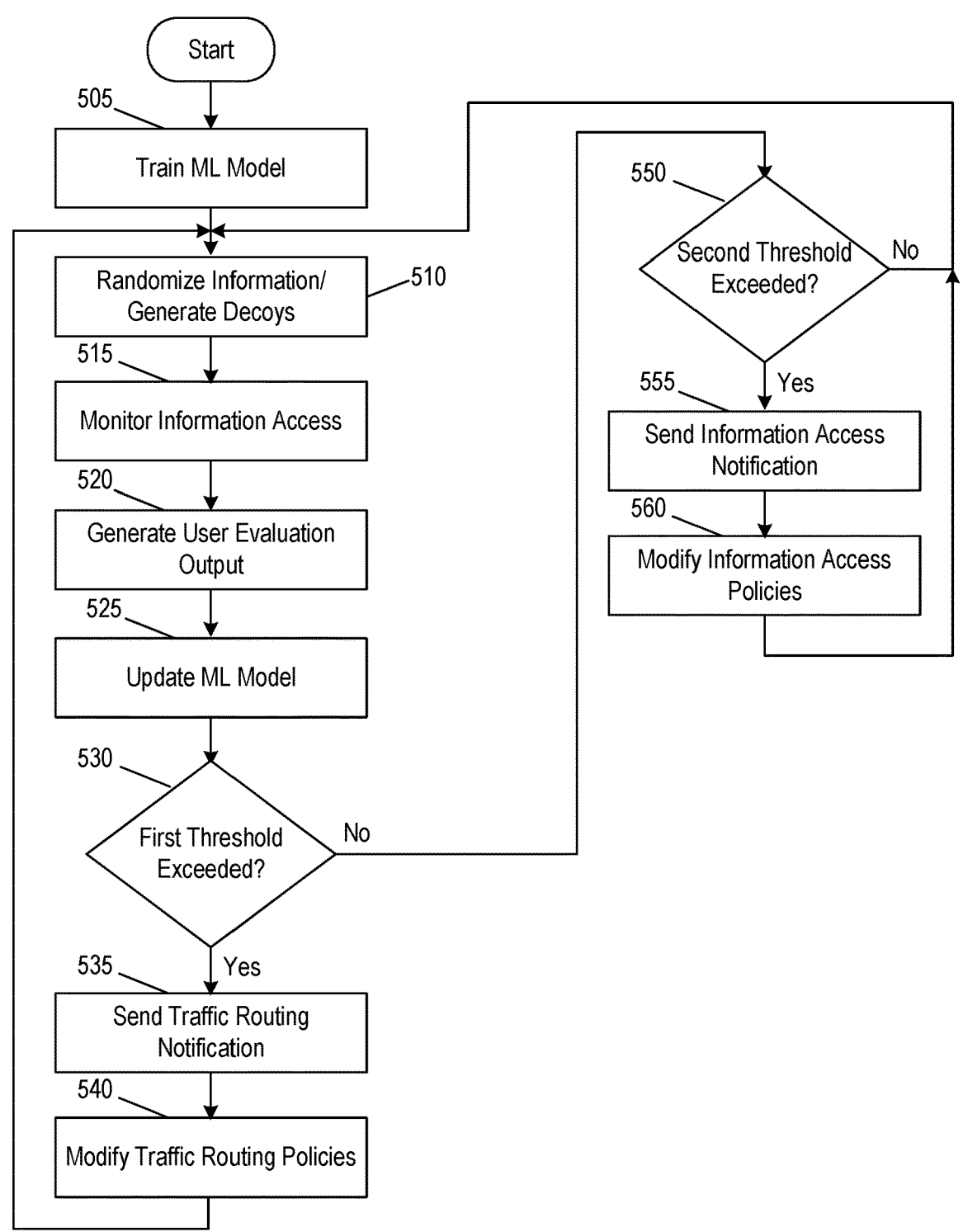
FIG. 5 depicts an illustrative method for countermeasure implementation to prevent information misuse in accordance with one or more example embodiments.

FIG. 5 depicts an illustrative method for implementing countermeasures to prevent information misuse in accordance with one or more example embodiments. Referring to FIG. 5, at step 505, a computing platform comprising one or more processors, memory, and a communication interface may train a machine learning model to identify potential information misuse. For example, the computing platform may train the machine learning model using historical information access information and corresponding user evaluation outputs to establish stored correlations between them. At step 510, the computing platform may obscure internal information by randomizing the information, introducing decoy information, and/or performing other functions. In doing so, the computing platform may obscure any information patterns that may be utilized by a malicious actor to generate insights on behalf of an enterprise corresponding to the information. At step 515, the computing platform may monitor information access by a given user. For example, the computing platform may identify what information is being accessed, who is accessing it, when are they accessing it, who else is accessing it, where are they accessing it from, and/or other information. At step 520, the computing platform may input this information access information into the machine learning model to produce a user evaluation output. For example, the machine learning model may identify correlations between the information access information and stored information access information, and may select a user evaluation output accordingly. In these instances, the user evaluation output may be representative of a likelihood of misuse. At step 525, the computing platform may update the machine learning model based on the information access information, the user evaluation output, and/or other information (e.g., via a dynamic feedback loop. At step 530, the computing platform may compare the user evaluation output to a first threshold. If the computing platform identifies that the user evaluation output meets or exceeds the first threshold, it may proceed to step 535.

At step 535, the computing platform may send a traffic routing notification to an administrator user device for display. For example, the computing platform may send a notification indicating that traffic associated with the user is now being routed to a secure sandbox. At step 540, the computing platform may modify traffic routing rules to cause the traffic associated with the user to be routed to a secure sandbox. In these instances, the computing platform may cause analysis of the traffic at the secure sandbox accordingly. The computing platform may then return to step 510 to continue information obfuscation, user evaluation, and countermeasure implementation accordingly.

Returning to step 530, if the computing platform identifies that the user evaluation does not meet or exceed the first threshold, the computing platform may proceed to step 550 to identify whether the user evaluation output meets or exceeds a second threshold, lower than the first threshold. If the computing platform identifies that the user evaluation output does not meet or exceed the second threshold, it may return to step 510 to continue information obfuscation, user evaluation, and countermeasure implementation accordingly. Otherwise, if the computing platform identifies that the user evaluation output does meet or exceed the second threshold, the computing platform may proceed to step 555.

At step 555, the computing platform may send an information access notification to an administrator user device. For example, the computing platform may send a notification that one or more information access policies for the user have been updated. At step 560, the computing platform may modify the information access policies for the user. For example, the computing platform may cause certain information to be further obscured with hover overs and/or other interface elements, which may, in some instances, prompt for additional authentication information before granting access to the obscured information. The computing platform may return to step 510 to continue information obfuscation, user evaluation, and countermeasure implementation accordingly.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
train, using historical information access pattern information, a machine learning model to identify unauthorized information access patterns;
obscure internal traffic pattern information, wherein obscuring internal traffic pattern information comprises:
randomizing the internal traffic pattern information, and
introducing, into the internal traffic pattern information, decoy traffic pattern information;
monitor access of the obscured internal traffic pattern information;
generate, by inputting information of the access into the machine learning model, a user evaluation output, wherein the user evaluation output represents a likelihood of misuse by a user corresponding to the access;
compare the user evaluation output to a first user evaluation threshold; and
based on identifying that the user evaluation output meets or exceeds the first user evaluation threshold, modify traffic routing rules corresponding to the user, wherein modifying the traffic routing rules causes activity by the user to be routed to a secure sandbox for further analysis.

2. The computing platform of claim 1, wherein training the machine learning model using the historical information access pattern information comprises training the machine learning model using instances of historical information access labelled based on whether or not the corresponding instances were identified as misuse.

3. The computing platform of claim 1, wherein randomizing the internal traffic pattern information comprises rearranging the internal traffic pattern information.

4. The computing platform of claim 1, wherein introducing the decoy traffic pattern information comprises introducing white noise into the internal traffic pattern information.

5. The computing platform of claim 1, wherein the access is permitted based on access permissions, and wherein details of the access permissions are obscured from the user.

6. The computing platform of claim 5, wherein the access permissions define a separation of access between the internal traffic pattern information and storage systems corresponding to the internal traffic pattern information.

7. The computing platform of claim 1, wherein monitoring the access comprises monitoring which internal traffic pattern information is being accessed.

8. The computing platform of claim 1, wherein the memory stores additional computer readable instructions that, when executed by the at least one processor, cause the computing platform to:
generate, by a reporting system plug in of the computing platform, a summary indicating results of the monitoring and an indication that the user evaluation output meets or exceeds the first user evaluation threshold; and
send, to an administrator device, the summary and one or more commands directing the administrator device to display the summary, wherein sending the one or more commands directing the administrator device to display the summary causes the administrator device to display the summary.

9. The computing platform of claim 1, wherein routing the activity of the user to the secure sandbox further comprises:
granting, at the secure sandbox, decoy access for the user, wherein the decoy access grants supervised access, for the user, to decoy information generated based on the user's previous access, and
monitoring, at the secure sandbox, interactions of the user with the decoy information.

10. The computing platform of claim 1, wherein the machine learning model is further trained based on known user vulnerability information, and wherein generating the user evaluation output is further based on the known user vulnerability information.

11. The computing platform of claim 1, wherein the memory stores additional computer readable instructions that, when executed by the at least one processor, cause the computing platform to:
based on identifying that the user evaluation output does not meet or exceed the first user evaluation threshold, compare the user evaluation output to a second user evaluation threshold, wherein the second user evaluation threshold is lower than the first user evaluation threshold; and
based on identifying that the user evaluation output meets or exceeds the second user evaluation threshold, modify information access policies for the user.

12. The computing platform of claim 11, wherein modifying the information access policies for the user causes a portion of the internal traffic pattern information to be obscured by a hover over user interface element, and wherein the hover over user interface element prompts for additional authentication credentials to access the corresponding internal traffic pattern information.

13. The computing platform of claim 1, wherein the memory stores additional computer readable instructions that, when executed by the at least one processor, cause the computing platform to:
update, using a dynamic feedback loop and based on the information of the access and the user evaluation output, the machine learning model, wherein updating the machine learning model increases accuracy of the machine learning model in identifying information misuse.

14. The computing platform of claim 1, wherein the memory stores additional computer readable instructions that, when executed by the at least one processor, cause the computing platform to:
decrease levels of employee system access as the likelihood of misuse increases.

15. The computing platform of claim 1, wherein the historical information access pattern information comprises: what data was accessed, where the data was accessed from, who accessed the data, communication information, and how often the data was accessed, and wherein the historical information access pattern information is labelled with historical evaluation scores indicating corresponding likelihoods of misuse, and wherein training the machine learning model comprises establishing stored correlations between historical information access patterns and evaluation scores.

16. The computing platform of claim 1, wherein training the machine learning model is further based on known user information, wherein the known user information indicates whether a user is engaged in side-businesses or remote work arrangements, and wherein the memory stores additional computer readable instructions that, when executed by the at least one processor, cause the computing platform to:

based on detecting that the user is engaged in side-businesses or remote work arrangements, adjust an evaluation score for the user by multiplying the evaluation score by 1.1.

17. The computing platform of claim 1, wherein training the machine learning model comprises using: decision trees, bagging, boosting, random forest, k-NN, linear regression, artificial neural networks, support vector machines, classification, regression, clustering, anomaly detection, and artificial neural networks.

18. The computing platform of claim 1, wherein the memory stores additional computer readable instructions that, when executed by the at least one processor, cause the computing platform to:

perform, at the secure sandbox, additional countermeasures, wherein the additional countermeasures comprise: identifying additional users involved in the misuse, shutting off information access to the additional users, and granting decoy access to the additional users, wherein the additional countermeasures are automatically initiated.

19. A method comprising:

at a computing platform comprising at least one processor, a communication interface, and memory:

training, using historical information access pattern information, a machine learning model to identify unauthorized information access patterns;

obscuring internal traffic pattern information, wherein obscuring internal traffic pattern information comprises:

randomizing the internal traffic pattern information, and introducing, into the internal traffic pattern information, decoy traffic pattern information;

monitoring access of the obscured internal traffic pattern information;

generating, by inputting information of the access into the machine learning model, a user evaluation output, wherein the user evaluation output represents a likelihood of misuse by a user corresponding to the access;

comparing the user evaluation output to a first user evaluation threshold; and based on identifying that the user evaluation output meets or exceeds the first user evaluation threshold, modifying traffic routing rules corresponding to the user, wherein modifying the traffic routing rules causes activity by the user to be routed to a secure sandbox for further analysis.

20. One or more non-transitory computer-readable media storing instructions that, when executed by a computing platform comprising at least one processor, a communication interface, and memory, cause the computing platform to:

train, using historical information access pattern information, a machine learning model to identify unauthorized information access patterns;

obscure internal traffic pattern information, wherein obscuring internal traffic pattern information comprises:

randomizing the internal traffic pattern information, and introducing, into the internal traffic pattern information, decoy traffic pattern information;

monitor access of the obscured internal traffic pattern information;

generate, by inputting information of the access into the machine learning model, a user evaluation output, wherein the user evaluation output represents a likelihood of misuse by a user corresponding to the access;

compare the user evaluation output to a first user evaluation threshold; and based on identifying that the user evaluation output meets or exceeds the first user evaluation threshold, modify traffic routing rules corresponding to the user, wherein modifying the traffic routing rules causes activity by the user to be routed to a secure sandbox for further analysis.

* * * * *